United States Patent [19]

Keller et al.

[11] Patent Number: 5,176,954
[45] Date of Patent: Jan. 5, 1993

[54] HIGH OPACITY FILM AND METHOD THEREOF

[75] Inventors: Lajos E. Keller, Luxembourg, Luxembourg; Larry G. Swan, Fairport; John R. Wagner, Rochester, both of N.Y.

[73] Assignee: Mobil Oil Corporation, Fairfax, Va.

[21] Appl. No.: 710,234

[22] Filed: Jun. 3, 1991

Related U.S. Application Data

[63] Continuation of Ser. No. 456,066, Dec. 21, 1989, abandoned, which is a continuation of Ser. No. 324,134, Mar. 16, 1989, abandoned.

[51] Int. Cl.⁵ ............................ B32B 3/26; B32B 5/16
[52] U.S. Cl. .................................... 428/317.9; 428/315.5; 428/516; 428/910; 428/347; 428/323; 428/330
[58] Field of Search ................... 428/516, 317.9, 315.5, 428/910, 347, 349, 323, 330, 331

[56] References Cited

U.S. PATENT DOCUMENTS

| | | | |
|---|---|---|---|
| 4,377,616 | 3/1983 | Ashcraft et al. | 428/910 X |
| 4,632,869 | 12/1986 | Park et al. | 428/910 X |
| 4,652,489 | 3/1987 | Crass et al. | 428/910 X |
| 4,702,954 | 10/1987 | Duncan | 428/317.9 X |
| 4,704,323 | 11/1987 | Duncan et al. | 428/317.9 X |
| 4,741,950 | 5/1988 | Liu et al. | 428/910 X |
| 4,758,462 | 7/1988 | Park et al. | 428/910 X |
| 4,780,364 | 10/1988 | Wade et al. | 428/317.9 X |
| 4,965,123 | 10/1990 | Swan et al. | 428/315.5 X |
| 4,983,447 | 1/1991 | Crass et al. | 428/516 X |
| 5,026,592 | 6/1991 | Janocha et al. | 428/516 X |

Primary Examiner—George F. Lesmes
Assistant Examiner—D. R. Zirker
Attorney, Agent, or Firm—A. J. McKillop; C. J. Speciale; J. P. O'Sullivan

[57] ABSTRACT

A non-symmetrically layered, highly opaque, biaxially oriented polymer film with a core containing numerous microscopic voids and at least about 1% by weight of opacifying compounds; a first skin layer on one surface of the core containing up to about 12% by weight of inorganic particulate material; and a second skin layer on the other surface of the core.

14 Claims, 1 Drawing Sheet

HIGH OPACITY FILM AND METHOD THEREOF

This application is a continuation of Ser. No. 07/456,066, filed Dec. 21, 1989, now abandoned, which is a continuation of Ser. No. 07/324,134, filed Mar. 16, 1989, now abandoned.

BACKGROUND OF THE INVENTION

The present invention relates to sealable multilayer films of unusually high opacity and unusually low light transmission and to a method of making said films.

In the packaging of certain types of foods, such as snack foods like potato chips, cookies and the like, it is common practice to employ a multilayer film. A desirable property in such a packaging film is an opacity which protects the packaging product from deterioration caused by exposure to light. In particular, it has been found that certain wavelengths of light, up to about 450 nm cause increased spoilage in such packaged products. Even when a degree of opacity is present in the film, spoilage occurs if the film allows passage of some light.

Oriented opaque film compositions are known in the art. U.S. Pat. No. 4,377,616 discloses an opaque biaxially oriented polymer film structure comprising a thermoplastic polymer matrix core possessing numerous voids, a substantial number of which contain at least one spherical void-initiating particle, and transparent thermoplastic skin layers adhering to the surfaces of the core layer.

U.S. Pat. No. 4,632,869 discloses an opaque, biaxially oriented film structure having a polymer matrix with a strata of voids, the voids containing spherical void-initiating particles of polybutylene terephthalate. The structure may also include thermoplastic skin layers and the film can include from about 1% to 3% by weight of a pigment such as TiO$_2$ or colored oxides.

U.S. Pat. No. 4,758,462 also discloses an opaque, biaxially oriented film with a cavitated core and transparent skin layers. Colored light absorbing pigments such as carbon black or iron oxide are added to the core and/or the skins in an amount of about 2 to 12 weight % to decrease light transmission through the film.

U.S. Pat. No. 4,652,489 discloses an oriented, sealable, opaque polyolefin multilayer film with a core layer containing vacuoles, a sealable surface layer, and a non-sealable surface layer which incorporates a slip agent such as a polydiorganosiloxane.

U.S. Pat. No. 4,741,950 discloses a differential opaque polymer film with a core layer containing numerous microscopic voids, a rough-appearing wettable first skin layer which contains an antiblocking agent such as silica, silicate, clay, diatomaceous earth, talc and glass, and a second wettable skin layer with a smooth appearance which may be metallized. TiO$_2$ may be present in the core and/or first skin layer. The film allows a light transmission of 24%.

All of the aforementioned films are opaque, but none provides a film with essentially 100% opacity with exceptionally low light transmission, especially in the damaging UV and blue wavelengths. Nor do these references disclose an economical asymmetrical multilayer film structure with differential appearance having metallic appearance on one side and a substantially whiter opposite side which allows printing or bonding to a substrate or coating.

Accordingly, it is an object of the present invention to provide a film with exceptionally low light transmission especially in the UV and blue wavelengths.

It is a further object of the present invention to provide a film which also has high opacity.

It is another object of the present invention to provide a film with a highly functional differential appearance.

It is yet another object of the present invention to provide a film which may be bonded to a wide variety of substrates and coatings.

SUMMARY OF THE INVENTION

The film structure of the present invention is a non-symmetrical, highly opaque, biaxially oriented polymeric film with a core containing numerous microscopic voids and at least about 1% by weight of opacifying compounds; a first skin layer on one surface of the core layer, containing up to 12% by weight of inorganic particulates; and a second skin layer on the other surface of the core layer.

The film's non-symmetrical structure results from the relative dimensions of the layers which range from about 60% to about 85% of the total structural thickness for core layer (a), about 10% to about 30% for the first skin layer (b), and about 1% to about 15% for the second skin layer (c).

The film offers unusually good protection against light, with an opacity of essentially 100%, and essentially zero light transmission in the wavelength range of from 250 nm to 500 nm which is particularly damaging to a packaged food product.

The asymmetrical configuration of the layers offers great flexibility and economy in achieving desired film characteristics. Layer (b) which may be on a package exterior allows optimum protection against water vapor transmission and a surface which can be printed, laminated or otherwise modified. Core layer (a) has all the advantages of cavitation but with even greater protection against light. Skin layer (c) can be a simple, economical thin encapsulating layer or it can be a more elaborate heat sealable layer.

The composition and asymmetry of the layers impart a differential appearance which is whitish and glossy when viewed from layer (b), suitable for a package exterior and a darker metallic appearance when viewed from skin layer (c) which is suitable for the inside of a food package.

For a better understanding of the present invention, together with other and further objects, reference is made to the following description, taken together with the accompanying drawings, and its scope will be pointed out in the appended claims.

DETAILED DESCRIPTION OF THE INVENTION

Figure 1:
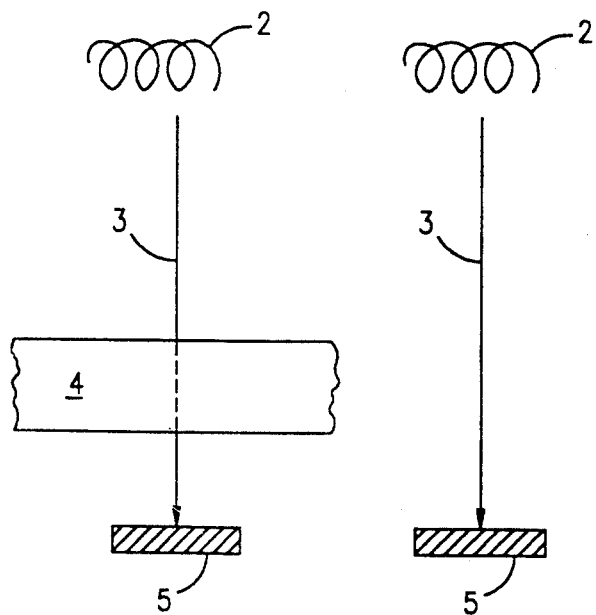
FIG. 1 is a schematic diagram of a method for determining percent light transmission.

In order to achieve the unique film structure of the present invention, it is important that a particular thickness relationship exist between the thickness dimension of the core and the thickness of the skin layers. it is preferred that the core thickness be from about 60 to about 90% of the overall structure with about 65-75% preferred. This in combination with the population and configuration of the voids in a total structure at least about 1.0 mil thick, will materially contribute to the overall degree of opacity of the structure. Likewise, by maintaining the thickness of the skin layers within particular ranges in relation to the overall structure and to the thickness of the core layer, the overall combination results in unique advantages. Skin layer (b) on the one surface of core layer (a) has a thickness of from about 10 to about 30% of the overall structure, with a thickness of about 20 to about 25% preferred. This layer serves an important function in reducing water vapor transmission rate (WVTR). Skin layer (c) on the opposite surface of the core has a thickness of from about 1% to about 15% of the overall structure with about 5% to about 10.5% preferred. The relative thinness of this layer adds to economy in production especially when the layer is an expensive heat-sealable material. A preferred structure might include, for example, a core layer with a thickness of 70% of the overall structure with skin layer (b) having a thickness of 25% and layer (c) having a thickness of 5%.

The core is a thermoplastic polymer matrix material within which is located strata of voids. From this it is to be understood that the voids create the matrix configuration.

The opacity and low light transmission of the film are enhanced by the addition to the core layer of at least about 1% by weight and up to about 10% by weight of opacifying compounds, which are added to the melt mixture of the core layer before extrusion. Opacifying compounds which may be used include iron oxides, carbon black, aluminum, $TiO_2$, and talc. The opacifying compounds do not contribute to void formation.

In order to aid in providing the film with exceptionally low light transmission, especially in the UV and blue wavelengths, iron oxide is added to core layer in an amount of from about 1 to about 8% by weight with about 2% to 4% by weight preferred. Carbon black may also be use. Preferably, aluminum is also added in an amount of from 0 to about 1.0% by weight with about 0.25% to 0.75% preferred and 0.5% most preferred. Preferably, the core layer also contains from about 0.5% by weight to 3% by weight of $TiO_2$ and/or talc.

In a preferred embodiment, from about 3% to about 9% by weight of inorganic particulate material such as $TiO_2$ and/or talc is added to the melt mixture of layer (b) before extrusion.

As a result of the additions to the core layer and layer b, the film presents a differential appearance. The term "differential" as applied to the oriented film of this invention is intended to convey the concept of the distinctly dissimilar composition and appearance of each exposed film surface. When viewed from layer (c), the film has a metallic appearance similar to aluminum foil laminations. It is contemplated that when the subject film is used in packaging, skin layer (c) is preferably positioned on the interior of a package and layer (b) is preferably positioned on the package exterior. When viewed from the layer (b) side, the film is substantially whiter and presents an excellent printable surface and an appealing appearance desirable for a package exterior.

The film has very high opacity and very low light transmission. A distinction must be made between opacity and light transmission for the purposes of this invention. Opacity is the opposite of transparency and is a function of the scattering and reflection of light transmitted through the film. Opacity is the ability, for example, to block out writing below it. Light transmission is a function of light passing more directly through the film.

Referring now to FIG. 1, the percent light transmission through a film is determined by using light source 2 to transmit light rays 3 directly through film 4 and measuring at light sensor 5, value $T_2$ which is the amount of light which is transmitted through film 4. The amount of light rays 3 which can be directly transmitted, value $T_1$, is determined by measuring the light 3 directly transmitted by light source 2 with no intervening film. The percent light transmission through the film can then be determined using the formula:

$$\% \text{ Light Transmission} = \frac{T_2}{T_1}$$

Figure 2:
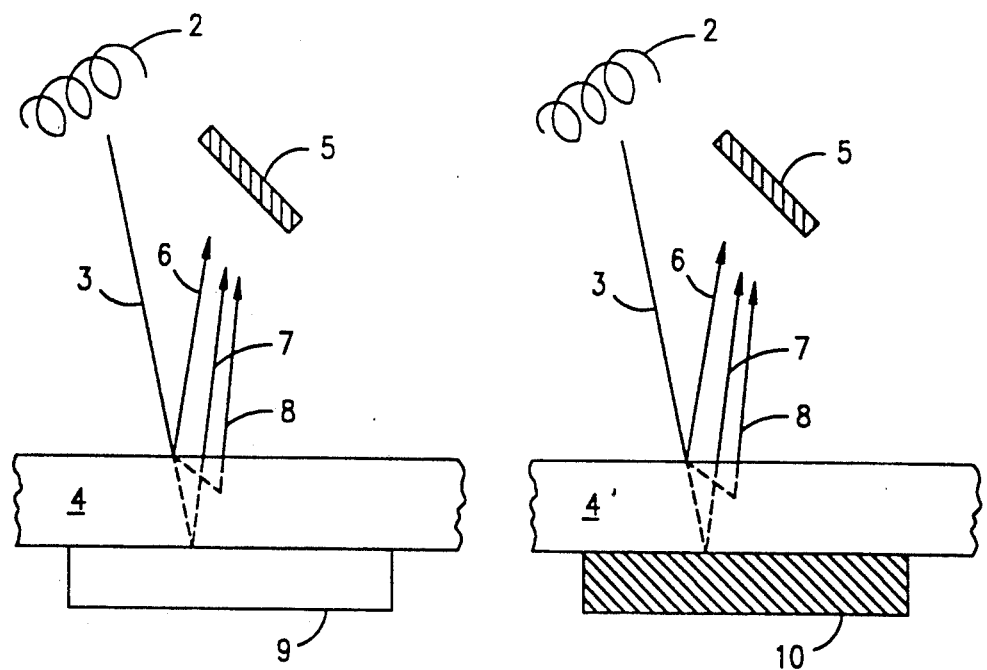
FIG. 2 is a schematic diagram of a method for determining percent opacity.

Referring now to FIG. 2, for a measure of percent opacity of a film, light source 2 transmits light through film 4 onto a white surface 9 and the same procedure used to project light onto a black surface 10. With both white and black surfaces, measurement at light sensor 5 is of all of the following: light reflected off the upper surface of the film 6; light transmitted through the film and reflected by the white or black surfaces 7 on the side of the film opposite from the light source; and, light scattered by the film 8.

The percent opacity of the film can then be determined using the formula:

$$\% \text{ Opacity} = 100 \times \frac{R_B}{R_W}$$

where $R_W$ = Reflected light + scattered light + light transmitted through the film and reflected off a white surface $R_B$ = Reflected light + scattered light + light transmitted through the film and reflected off a black surface Accordingly, a highly reflective film may provide high opacity while allowing light transmission. This is because percent light transmission is not the equivalent of percent opacity.

Light transmission is the amount of light passing directly through the film. To prevent food spoilage decreased light transmission is desirable. Prevention of light transmission in shorter UV wavelengths up to 400 nm and the blue-violet range of from 400 to 450 nm is particularly desirable for this purpose.

Through a combination of opacity resulting from film core cavitation and the addition of metal compounds, pigment, and inorganic particulate material, the present invention provides an opacity of essentially 100%, and a light transmission of essentially zero in the UV range measured at 250 nm and light transmission which is so low as to be essentially zero in the 450 nm blue range.

In forming the core layer, as in U.S. Pat. No. 4,377,616, the disclosure of which is incorporated herein by reference in its entirety, a master batch technique can be employed by either in the case of forming the void initiating particles in situ or in adding preformed spheres to a molten thermoplastic matrix material. After the formation of a master batch, appropriate dilution of the system can be made by adding additional thermoplastic matrix material until the desired proportions are obtained. However, the components may also be directly mixed and extruded instead of utilizing a master batch method.

The void-initiating particles which are added as filler to the polymer matrix material of the core layer can be any suitable organic or inorganic material which is incompatible with the core material at the temperature of biaxial orientation such as polybutylene terephthalate, nylon, solid or hollow preformed glass spheres, metal beads or spheres, ceramic spheres, calcium carbonate, etc.

The polyolefin contemplated as the core material includes polypropylene, polyethylene, polybutene and copolymers and blends thereof. Particularly preferred is an isotactic polypropylene containing at least about 80% by weight of isotactic polypropylene. It is also preferred that the polypropylene have a melt flow index of from about 2 to 10 g/10 min.

It is preferred that the average diameter of the void-initiating particles be from about 0.1 to about 10 microns. These particles may be of any desired shape although it is preferred that they be substantially spherical in shape. This does not mean that every void is the same size. It means that, generally speaking, each void tends to be of like shape when like particles are used even though they vary in dimensions. These voids may assume a shape defined by two opposed and edge contacting concave disks.

Experience has shown that optimum characteristics of opacity and appearance are obtained when the two average major void dimensions are greater than about 30 microns.

The void-initiating particle material, as indicated above, should be incompatible with the core material, at least at the temperature of biaxial orientation.

The core has been described above as being a thermoplastic polymer matrix material within which is located a strata of voids. From this it is to be understood that the voids create the matrix configuration. The term "strata" is intended to convey the understanding that there are many voids creating the matrix and the voids themselves are oriented so that the two major dimensions are aligned in correspondence with the direction of orientation of the polymeric film structure. After each void has been formed through the initiation of the described particle, the particle generally contributes little else to the system. This is because its refractive index can be close enough to the matrix material that it makes no contribution to opacity. When this is the case, the opacity is principally a function of the light scattering effect which occurs because of the existence of the voids in the system. As described hereinabove, iron oxide in an amount of from about 1 to about 8% by wt., preferably about 2% to 4% and aluminum in an amount of from 0 to about 1.0% by wt., preferably about 0.25% to 0.75% are added to the core matrix. Carbon black may also be used in lieu of some or all of the iron oxide.

A typical void of the core is defined as having major dimensions X and Y and minor dimension Z, where dimension X is aligned with machine direction orientation, dimension Y is aligned with transverse direction orientation and dimension Z approximately corresponds to the cross-sectional dimension of the spherical particle which initiated the void.

It is a necessary part of the present invention that orientation conditions be such that the X and Y dimensions of the voids of the core be major dimensions in comparison to the Z dimension. Thus, while the Z dimension generally approximates the cross-sectional dimension of the spherical particle initiating the void, X and Y dimensions must be significantly greater.

By way of illustration, room temperature biaxial orientation of a polypropylene matrix containing polybutylene terephthalate (PBT) spheres of the size and amount contemplated herein, could not produce the claimed structure. Either void splitting will occur, or, voids of insignificant size would result. Polypropylene must be oriented at a temperature significantly higher than its glass transition temperature. The temperature conditions must permit X and Y to be at least several multiples of the Z dimension without void splitting at least to any significant degree. If this is accomplished, optimum physical characteristics, including low water vapor transmission rates and a high degree of light scattering are obtained without void splitting or film fibrillating.

As indicated above, the matrix polymer and the void initiating particle must be incompatible and this term is used in the sense that the materials are two distinct phases. The spherical void initiating particles constitute a dispersed phase throughout the lower melting polymer which polymer will, ultimately, upon orientation, become a void-filled matrix with the spherical particles positioned somewhere in the voids.

As a result of the biaxial orientation of the film structure herein, in addition to opacifying the core layer of the structure, the orientation improves other physical properties of the composite layers such as flex-crack resistance, Elmendorff tear strength, elongation, tensile strength, impact strength and cold strength properties. The resulting film can have, in addition to a rich high quality appearance and excellent opacifying characteristics, low water vapor transmission rate characteristics and low oxygen transmission rate characteristics. This makes the film ideally suited for packaging food products including liquids. The film also has attractive utility as a decorative wrap material.

It is believed that because of comparative sphericity of the void-initiating particles, the voids are closed cells. The means that there is virtually no path open from one side of the core the other throughout which liquid or gas can transverse.

Skin layer (b) is present on one surface of the core layer and preferably is a material with a low WVTR. This layer may consist of a propylene; high density polyethylene; other ethylene homopolymer, copolymer, terpolymer, or blends thereof. The homopolymer contemplated herein is formed by polymerizing the respective monomer. This can be accomplished by bulk or solution.

The copolymer contemplated herein for layer (b) can be selected from those copolymers typically employed in the manufacture of multi-layered films. For example, a block copolymer of ethyene and propylene is formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from the preceding stage is sufficiently low to prevent formation of an excessive proportion of random copolymer.

The contemplated terpolymers which may be used for layer (b) are comparatively low stereoregular polymers. The terpolymers can have a melt flow rate at 446° F. ranging from about 2 to about 10 grams per 10 minutes and preferably from about 4 to about 6 grams per 10 minutes. The crystalline melting point can range from about less than 250° F. to somewhat greater than 371° F. The terpolymers will predominate in propylene, and the ethylene and 1-butene monomers can be present in approximately from 0.3:1-1:1 mole percentage in relation to each other.

Layer (b) may also be fabricated from blends of polypropylene, medium or high density polyethylene and mixtures thereof. A preferred material for a layer (b) is polypropylene.

If desired, the exposed surface of skin layer (b) can be treated in a known and conventional manner, e.g., by corona discharge to improve its receptivity to inks and/or its suitability for such subsequent manufacturing operations as lamination.

The exposed treated or untreated surface of layer (b) may have applied to it, coating compositions or substrates such as another polymer film or laminate; a metal foil such as aluminum foil; cellulosic webs, e.g. numerous varieties of paper such as corrugated paperboard, craft paper, glassine, cartonboard; non-woven tissue, e.g., spunbonded polyolefin fiber, melt-blown microfibers, etc. The application may employ a suitable adhesive, e.g., a hot melt adhesive such as low density polyethylene, ethylene-methacrylate copolymer, water-based adhesive such as polyvinylidene chloride latex, and the like.

In a preferred embodiment, the film of the present invention is extrusion laminated to another polyolefin film.

Layer (b) may also include up to about 12% by wt. with 4%-8% preferred and 6% most preferred, of inorganic particles such as titanium dioxide and talc to whiten the surface as well as provide antiblock properties. Layer (b) is contemplated as being the outer surface when the subject film is used in packaging. The whiteness resulting from the inclusion of $TiO_2$ provides an excellent surface for graphics. Furthermore, a whiteness in the layer (b) side of the film allows printing of laminated or unlaminated structures without requiring white ink.

Layer (c) is a think skin applied to the lower surface of core layer (a) and is a polyolefin coextruded with layer (a) in a thickness sufficient to encapsulate core layer (a). Layer (c) may be fabricated of the same materials disclosed hereinabove for layer (b). If layer (c) is not heat sealable, then heat sealable layer (d) may be applied to the outer surface of layer (c). Heat sealable layer (d) may be, for example, vinylidene chloride polymer or an acrylic polymer; or layer (d) may be coextruded from any of the heat sealable materials described for layer (c). Vinylidene chloride polymer or acrylic polymer coating may also be applied to the exposed exterior surface of skin layer (b).

A heat sealable layer (c) can be fabricated from any of the heat sealable copolymers, blends of homopolymers and blends of copolymer(s) and homopolymer(s) heretofore employed for this purpose. Illustrative of heat sealable copolymers which can be used in providing layer (c) of the present film are ethylene-propylene copolymers containing from about 1.5 to about 10, and preferably from about 3 to about 5 weight percent ethylene and ethylene-propylene-butene terpolymers containing from about 1 to about 10, and preferably from about 2 to about 6 weight percent ethylene and from about 80 to about 97, and preferably from about 88 to about 95 weight percent propylene. Heat sealable blends of homopolymer which can be utilized in providing layer (c) include from about 1 to about 99 weight percent polypropylene homopolymer, e.g., one which is the same as, or different from, the polypropylene homopolymer constituting core layer (a) blended with from about 99 to about 1 weight percent of a linear low density polyethylene (LDPE). If layer (c) is heat-sealable, corona or flame treatment of layer (c) is not required.

Heat sealable blends of copolymer(s) and homopolymer(s) suitable for providing layer (c) include: a blend of from about 5 to about 19 weight percent of polybutylene and from about 95 to about 81 weight percent of a copolymer of propylene (80 to about 95 mole percent) and butylene (20 to about 5 mole percent); a blend of from about 10 to about 90 weight percent of polybutylene and from about 90 to about 10 weight percent of a copolymer of ethylene (2 to about 49 mole percent) and a higher olefin having 4 or more carbon atoms (98 to about 51 mole percent); a blend of from about 10 to about 90 weight percent polybutylene and from about 90 to about 10 weight percent of a copolymer of ethylene (10 to about 97 mole percent) and propylene (90 to about 3 mole percent); and, a blend of from about 90 to about 10 weight percent of polybutylene, and from about 10 to about 90 weight percent of a copolymer of propylene (2 to about 79 mole percent) and butylene (98 to about 21 mole percent).

It is preferred that layers (a), (b), and (c) be coextruded. Thereafter, the film is biaxially oriented. For example, when employing polypropylene for the core matrix and the skin layers and employing PBT as the void initiating particles, a machine direction orientation may be from about 4 to about 8 and a transverse orientation may be from 4 to about 10 times at a drawing temperature of about 100° C. to 170° C. to yield a biaxially oriented film. A preferred film thickness is from about 0.5 mil to about 3.5 mils.

In a preferred embodiment of the invention, the cavitated core layer contains from about 1% to about 8% by wt. iron oxide and up to about 1% by wt. aluminum and layer (b) contains between about 1% and about 12% by wt. inorganic particulate material; so that the film has a differential appearance with a metallic appearance when viewed from the exposed surface of layer (c) and a substantially whiter appearance when viewed from the exposed surface of layer (b); the film has suitable relative thickness dimensions of the layers, and the film permits essentially zero light transmission in the 200 nm to 500 nm range and has an opacity in of essentially 10%. In addition, the film allows printing, bonding to a substrate lamination, or coating on the surface of layer (b).

In a most preferred embodiment, the cavitated core layer contains from about 2% to about 4% by wt. iron oxide and from about 0.25% to about 0.75% by wt. aluminum, and skin layer (b) contains from about 3 to about 8% inorganic particulate material so that the film has a differential appearance with a metallic appearance when viewed from the layer (c) side and a substantially whiter appearance when viewed from the layer (b) side, the film has suitable relative thickness dimensions, and another polyolefin film is extrusion laminated to the exposed surface of layer (b).

In the following Examples, percent light transmission in wavelengths of from 190 nm to 500 nm was measured with an IBM 9420 UV-visable spectrophotometer.

EXAMPLE 1

An acrylic/polyvinylidene-coated white film with a cavitated core was tested for light transmission. The film had a cavitated isotactic polypropylene (PP) core with PBT filler, skins of PP in a thickness of 0.15 mil., and an acrylic coating on one surface and a polyvinylidene coating on the opposite surface. Total film thickness was 1.5 mil.

EXAMPLE 2

A film with a cavitated polypropylene core, void initiating particles of PBT, and 0.12 mil. polypropylene skin layers containing 4% by wt. $TiO_2$ and 2% by wt. talc, and a film thickness of 2.0 mils was tested for light transmission.

EXAMPLE 3

A metallized oriented polypropylene film was tested for light transmission. This film was a clear polypropylene coated with aluminum on one side and had a total film thickness of 0.8 mils.

EXAMPLE 4

An isotactic polypropylene (94 parts, MP 160° C. and a melt flow rate of 4.5) containing 0.5% aluminum, 2.0% black iron oxide and PBT (6 parts, MP 227° C.) was melted in an extruder with a screw L/D ratio of 32/1 to become core layer (a). A second extruder in association with the first extruder was supplied with the same polypropylene (94 parts), 4% $TiO_2$ (4 parts), and 2% talc (2 parts). A third extruder in association with the first two was provided with an ethylene, 1-butene, polypropylene terpolymer. A film structure was coextruded with a core layer (a) having a thickness 70% of the total structure, a polypropylene layer (b) containing $TiO_2$ and talc comprising 25% of the total thickness and a terpolymer skin layer (c) comprising 5% of the total thickness. The unoriented sheet was oriented 5×8 times using a tenter apparatus. The resulting 2.0 mil film was tested for light transmission.

The results of Examples 1-4 are summarized in Table 1.

TABLE 1

| Wavelength (Nanometers) | Examples | | | |
|---|---|---|---|---|
| | 1 | 2 | 3 | 4 |
| | % Light Transmission | | | |
| 200 | 0 | 0 | 0.9 | 0 |
| 225 | 0 | 0 | 4.0 | 0 |
| 250 | 0.2 | 0 | 3.9 | 0 |
| 300 | 0.4 | 0 | 2.6 | 0 |
| 350 | 1.5 | 0 | 1.9 | 0 |
| 400 | 13.6 | 6.8 | 1.3 | 0.2 |
| 450 | 16.9 | 12.3 | 1.0 | 0.3 |
| 500 | 17.4 | 12.6 | 0.8 | 0.4 |

As shown in Table 1, Example 4 made according to the present invention demonstrated the best protection against transmission of light from 200 nm up to 500 nm, with essentially zero light transmission.

EXAMPLES 5-7

Examples 5-7 were prepared as Example 4 except that the film extrusion was varied to yield 29,400 in.$^2$/lb. in Example 5; 26,200 in.$^2$/lb. in Example 6; and 27,100 in.$^2$/lb. in Example 7. The films were tested for light transmission and opacity and the results are summarized in Table 2.

EXAMPLE 8

This symmetrical film had a cavitated, homopolymer polypropylene core and polypropylene skin layers, the film being extruded to yield a film of 30,000 in.$^2$/lb.

EXAMPLES 9-11

These symmetrical control films had cavitated polypropylene cores and polypropylene skin layers with 4% $TiO_2$ and 2% talc in both skin layers. Example 9 was extruded to yield 35,000 in.$^2$/lb. Example 10 was extruded to yield 27,800 in.$^2$/lb. Example 11 was extruded to yield 23,500 in.$^2$/lb.

Examples 8-11 were tested for light transmission and opacity and the results are summarized in Table 2.

As can be seen from the table, Examples 5-7 illustrating the present invention had better opacity of essentially 100% and lower light transmission than the typical films with cavitated cores of examples 8-11.

TABLE 2

| Example | Layer Thickness Ratios (%) | | | Film Thickness (mil) | % Light Transmission | | Opacity (Tappi) (%) |
|---|---|---|---|---|---|---|---|
| | (b) | (a) | (c) | | 250 nm | 450 nm | |
| 5 | 25 | 70 | 5 | 1.8 | 0.0 | 1.4 | 100 |
| 6 | 25 | 70 | 5 | 2.3 | 0.0 | 0.1 | 100 |
| 7 | 25 | 70 | 5 | 2.0 | 0.0 | 0.3 | 100 |
| 8 | 15 | 70 | 15 | 1.5 | 0.3 | 19.2 | 82 |
| 9 | 15 | 70 | 15 | 1.5 | 0.3 | 18.2 | 82 |
| 10 | 11 | 78 | 11 | 2.0 | 0.0 | 12.3 | 88 |
| 11 | 9 | 82 | 9 | 2.5 | 0.0 | 9.5 | 91 |

EXAMPLES 12-13

These symmetrical control films were made according to U.S. Pat. No. 4,758,462. A mixture of isotactic polypropylene (92 parts, MP 165° C. and melt flow rate of 4.5), PBT (6 parts, MP 227° C.) and 2% $TiO_2$ was melted in an extruder provided with a screw of L/D ratio of 20/1. A second extruder in association with the first extruder was provided with the same polypropylene without PBT and $TiO_2$.

In Example 12, light absorbing colored pigment (iron oxide) was added to the core formulation in an amount of 1.7 weight %.

In Example 13, light absorbing colored pigment was added to the core formulation in an amount of 4.4 weight %.

In both examples 12 and 13, a symmetrical sheet was coextruded to yield 30,000 in.$^2$/lb. The core thickness was 70% of the total structure, and each skin layer was 15% of the total structure thickness. The sheet was biaxially oriented and the resulting 1.5 mil film was tested for light transmission. The results are shown in Table 3.

TABLE 3

| Example | Total Pigment Level (wt. %) | % Light Transmission | |
|---|---|---|---|
| | | 250 nm | 450 nm |
| 12 | 1.7 | 0.8 | 7.1 |
| 13 | 4.4 | 0.2 | 2.6 |

As can be seen, even with a higher pigment level, Examples 12 and 13 did not protect against light transmission as well as the present invention.

The data of Examples 4-7 clearly show the unexpected superiority of this invention in providing a film with essentially 100% opacity and exceptionally low light transmission, especially in the damaging UV and blue wavelengths.

While there have been described what are presently believed to be the preferred embodiments of the present invention, those skilled in the art will realize that changes and modifications may be made thereto without departing from the spirit of the invention, and it is indicated to claim all such changes and modifications as fall within the true scope of the invention.

What is claimed is:

1. A non-symmetrically layered, biaxially oriented polymer film comprising:
   (a) a core thermoplastic polymer matrix material within which is located a strata of voids; positioned at least substantially within at least a substantial number of each of said voids, is at least one spherical void-initiating particle which is phase distinct and incompatible with said matrix material, the void space occupied by said particle being substantially less than the volume of said void, with one generally core-sectional dimension of said particle at least approximating a corresponding cross-sectional dimension of said void, said core layer also containing from about 1% to about 8% by weight iron oxide, from about 0.1% to about 1% by weight aluminum, and from about 1.5% to about 3% by weight of $TiO_2$;
   (b) a first void-free skin layer on one surface of the core layer containing up to about 12% by weight of inorganic particulate material;
   (c) a second void-free particulate-free skin layer on the other surface of the core layer; and
   wherein the core thickness is about 60 to about 90% of the overall film thickness, skin layer (b) is about 10 to about 30% of the overall film thickness and skin layer (c) is about 1 to about 15% of the overall thickness, said film having an opacity of essentially 100% and light transmission in the 250 nm-450 nm region is essentially zero.

2. The film of claim 1 wherein the core layer is fabricated from isotactic polypropylene.

3. The film of claim 1 wherein the core layer contains void-initiating particles of polybutylene terephthalate.

4. The film of claim 1 wherein layer (b) is fabricated from isotactic polypropylene.

5. The film of claim 1 wherein layer (b) contains between about 3% and about 9% inorganic particulate material.

6. The film of claim 1 wherein the inorganic particulate material in layer (b) is titanium dioxide and/or talc.

7. The film of claim 1 wherein layer (c) is fabricated from a heat sealable material.

8. The film of claim 7 wherein the heat sealable material is selected from the group consisting of homopolymer of propylene, copolymer of propylene and ethylene, copolymer of propylene and butylene, terpolymer of ethylene, propylene and butylene, and combinations thereof.

9. The film of claim 1 wherein layer (c) is fabricated from an ethylene, 1-butene, propylene terpolymer.

10. The film of claim 1 wherein a heat sealable layer (d) is applied to an exposed surface of layer (c).

11. The film of claim 1 wherein a substrate is adhesively bonded to an exposed surface of layer (b).

12. The film of claim 1 wherein a coating is applied to the exposed surface of layer (b).

13. The film of claim 1 wherein a coating is applied to the exposed surface of layer (c).

14. The film of claim 1 wherein a polyolefin film is extrusion laminated to the exposed surface of layer (b).

* * * * *